No. 897,701. PATENTED SEPT. 1, 1908.
E. A. BAKER.
DETACHABLE RIM FOR VEHICLE WHEEL TIRES.
APPLICATION FILED JAN. 25, 1907.

2 SHEETS—SHEET 1.

WITNESSES:
J. Clyde Ryle
E. Bradford

INVENTOR
Edwin A. Baker.
BY
ATTORNEY

No. 897,701. PATENTED SEPT. 1, 1908.
E. A. BAKER.
DETACHABLE RIM FOR VEHICLE WHEEL TIRES.
APPLICATION FILED JAN. 25, 1907.
2 SHEETS—SHEET 2.
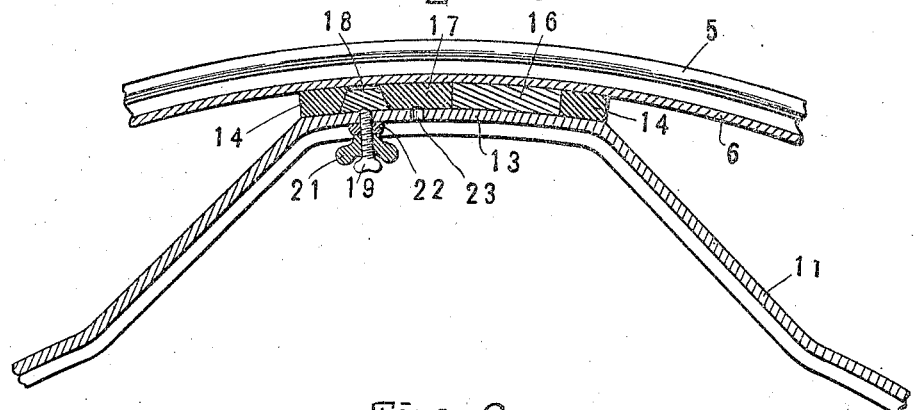
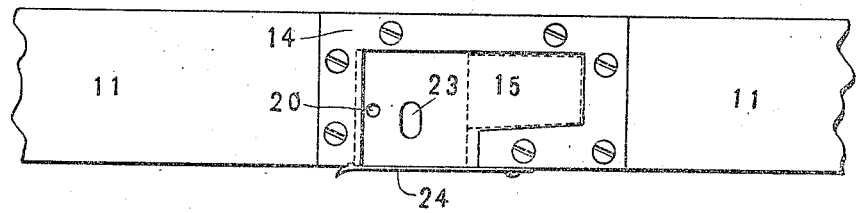
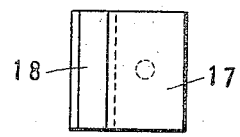
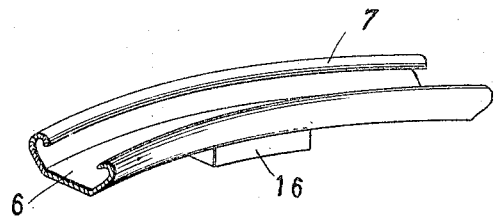
WITNESSES:
INVENTOR
Edwin A. Baker
ATTORNEY

UNITED STATES PATENT OFFICE.

EDWIN ALBERT BAKER, OF NEW YORK, N. Y., ASSIGNOR TO RAPID REMOVABLE RIM COMPANY, OF NEW YORK, N. Y.

DETACHABLE RIM FOR VEHICLE-WHEEL TIRES.

No. 897,701.      Specification of Letters Patent.      Patented Sept. 1, 1908.

Application filed January 25, 1907. Serial No. 354,014.

*To all whom it may concern:*

Be it known that I, EDWIN ALBERT BAKER, a citizen of the United States, residing at New York, county of New York, State of New York, have invented certain new and useful Improvements in Detachable Rims for Vehicle-Wheel Tires, of which the following is a full, clear, and exact description.

My invention relates to improvements in vehicle wheel tires and particularly of the detachable rim type for motor vehicles and the like where it is often desirable to change tires quickly.

The ordinary type of pneumatic tire is provided with a valved inlet stem and also provided with lugs for securing the tire to the rim.

It is my main object to secure the tire to the wheel so that the valve stem and lugs are not interfered with. This makes it possible to utilize ordinary commercial tires without alteration.

Another object is to facilitate the attachment and detachment of the tire and rim to the wheel.

Another object is to prevent binding.

Another object is to take up wear and inequalities in dimensions.

Another object is to adapt the tire to racing as well as road use.

The principles of the invention are illustrated in the accompanying two sheets of drawings.

Figure 1:
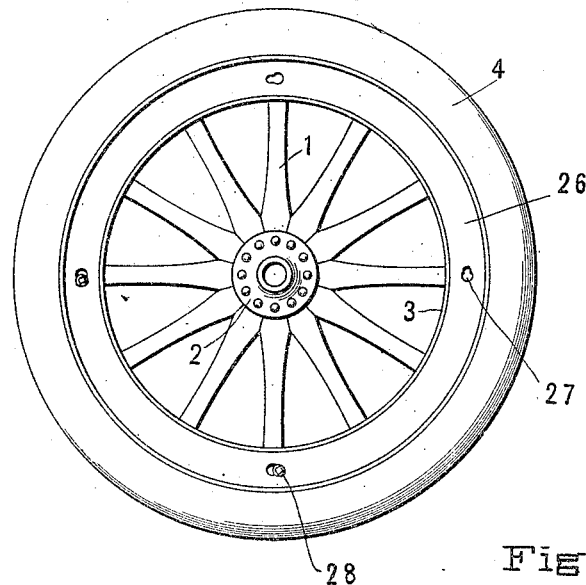
Figure 2:
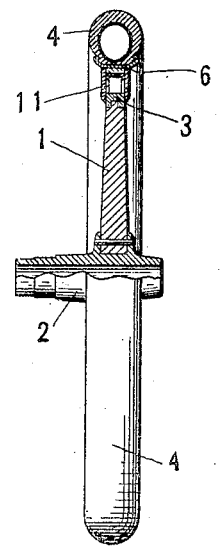
Figure 3:
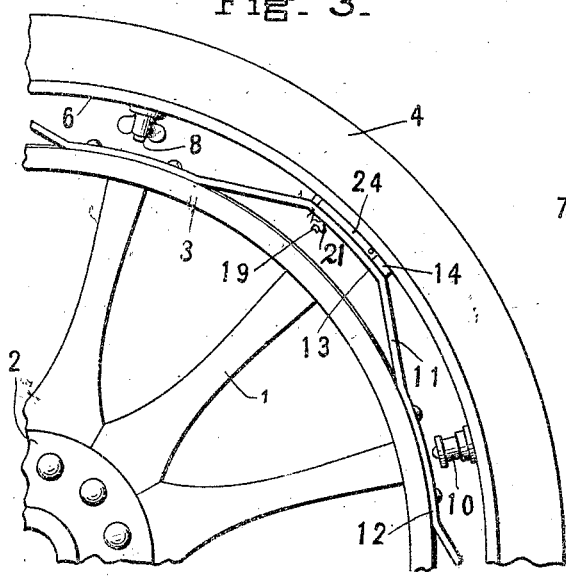
Figure 4:
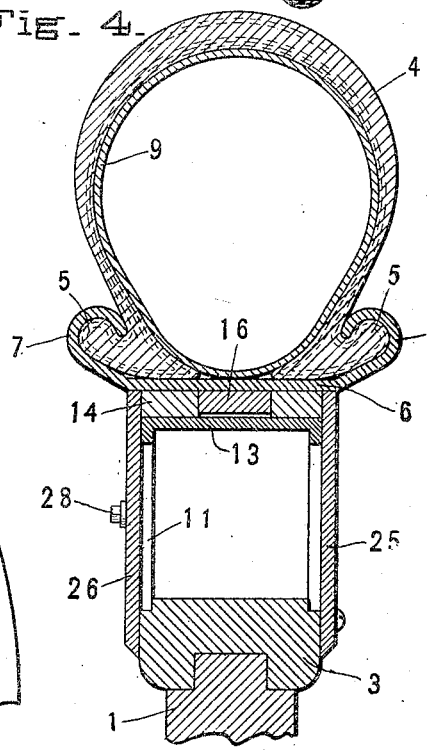

Figure 1 is a side view of a vehicle wheel with the improvements of my invention. Fig. 2 is an edge view and partial transverse sectional view of the same. Fig. 3 is an enlarged fragmentary side elevation, parts being omitted. Fig 4 is a full sized fragmentary sectional view showing the invention. Fig. 5 is a fragmentary vertical section showing details of construction. Fig. 6 is a fragmentary plan view showing part of the attaching mechanism. Fig. 7 is a perspective view of a fragment of the tire rim and part of the attaching mechanism. Fig. 8 is a plan view of two take-up blocks for assisting in securing the parts together.

The wheel is of the ordinary construction, for instance, having spokes such as 1, and hub 2, and a rim 3.

The tire is of the ordinary construction, for instance, having a shoe 4, with tongues 5, 5 locked to the tire rim 6, beneath the beads 7, 7 by means of ordinary lugs such as 8. The inner tube 9, has the ordinary valved inlet stem 10.

Between the rims of the wheel and the tire, I locate what may be termed a spacer 11, formed of channel iron which is secured to the rim 3, at a number of points, such as 12, and has a number of intermediate raised platforms, such as 13, spaced apart from rim 3. The tire rim 6, is secured to the raised platforms 13, 13 as hereinafter described, the lugs for fastening the tire to its rim and the valve stem being located between the raised platforms so that there is no interference with them.

On each platform 13, is securely fastened a plate 14, preferably formed of bronze or similar noncorrodible metal and having an " L " shaped recess 15, with an entrance on one side. A plurality of blocks such as 16, are secured to a tire rim 6, and correspond in number and position with the recesses 15, so that the tire rim may be placed in the position with its blocks opposite the inlets to the recesses. The tire rim may then be pushed into place so that each block 16, will take up a position as indicated by the dotted lines in the right hand ends of the recesses 15, in Fig. 6. To secure the tire rim and blocks 16, in position, I provide a pair of take-up members such as 17, and 18, (see Fig. 8) which may be inserted from the side through the mouth or inlet in recesses 15. The thumb-screw 19, fits into a tapped opening 20, in the platform 12, and is adapted to force the wedge-shaped take-up block 18, against the inclined surfaces of the take-up block 17, and the plate 14, so as to securely hold the parts in position and take up all loose play. The action of this wedge member 18, not only moves the block 17, toward the right, but also forces it out against the tire rim 6, so that a double function is performed which effectively secures the parts. The thumb-nut 21, operating on the shank of thumb-screw 19, presses against a washer 22, and serves to prevent the thumbscrew 19, from working loose. An elongated slot 23, permits access to block 17, for the purpose of prying it out in case of jamming, and pivoted spring 24, may be employed to assist in holding the take-up members 17, and 18, in position.

The construction thus far described is suitable for the wheels of racing vehicles where light weight and ready accessibility is essential. For ordinary commercial and road vehicles it may in some cases be desirable to inclose the spacing member and the lugs and valve stem. This is accomplished by means of two annular rings 25, and 26. The first may be permanently or otherwise secured in place, while the second, which covers the entrance to the recesses 15, is removable. For this purpose it is provided with a number of key-hole slots such as 27, and clamp-nuts such as 28, are provided to coöperate therewith so that the ring 26, may be attached and detached readily.

The advantages of my invention will be appreciated by those acquainted with the art, and particularly when the herein above-mentioned objects are considered.

I wish it understood that I do not consider myself limited to the details of construction herein set forth, but believe the invention to be susceptible of many modifications without departing from its spirit or scope.

What I claim is:

1. A wheel construction, including a tire rim, a platform, one of said members having a recess, and two clamping members in said recess, one of said members being circumferentially adjustable; and the other member being radially adjustable.

2. A wheel construction, including a tire rim, a platform, one of said members having a recess, two clamping members in said recess, one of said members being circumferentially adjustable, and the other member being radially adjustable, and means for adjusting said members.

3. A wheel construction, including a tire rim, a projection carried thereby, a platform having a slot adapted to receive said projection and radially and circumferentially adjustable means for coöperating with said projection in said slot.

4. In a wheel construction, a wheel rim, a plurality of raised platforms carried thereby and spaced apart from each other, a plate mounted on the periphery of each platform and having a laterally open recess, a tire rim and tire having a valve stem and lugs located between said platforms, a plurality of blocks carried by the tire rim and registering with said recesses, tapered members radially movable for forcing the rim blocks circumferentially in the recesses and means for moving said tapered members.

5. In a wheel construction, a wheel rim having a plurality of raised platforms and a recess in each platform, a tire rim with tire and inwardly extending lugs and valve stem accommodated in the spaces between said platforms, blocks carried by the tire rim and fitting said platform recesses, and radially adjustable means carried by said platforms for forcing said blocks circumferentially and holding them in place, one of said parts being provided with an inclined surface.

EDWIN ALBERT BAKER.

Witnesses:
STEWART H. JONES,
ROBT. S. ALLYN.